(12) United States Patent
Nobu (10) Patent No.: US 7,074,144 B2
(45) Date of Patent: Jul. 11, 2006

(54) HYDRAULIC CONTROL APPARATUS FOR VEHICLE WITH BELT-DRIVE CONTINUOUSLY VARIABLE TRANSMISSION

(75) Inventor: Hisao Nobu, Kanagawa (JP)

(73) Assignee: Jatco Ltd, Fuji (JP)

( * ) Notice: Subject to any disclaimer, the term of this patent is extended or adjusted under 35 U.S.C. 154(b) by 481 days.

(21) Appl. No.: 10/670,271

(22) Filed: Sep. 26, 2003

(65) Prior Publication Data

US 2004/0063526 A1 Apr. 1, 2004

(30) Foreign Application Priority Data

Sep. 30, 2002 (JP) ............... 2002-285499

(51) Int. Cl.
*F16H 61/12* (2006.01)
*F16H 59/04* (2006.01)

(52) U.S. Cl. .......................... 474/28; 474/18
(58) Field of Classification Search ............... 474/18, 474/28, 46; 477/44–49; 475/209–210, 95, 475/149
See application file for complete search history.

(56) References Cited

U.S. PATENT DOCUMENTS

| | | | |
|---|---|---|---|
| 4,458,318 A * | 7/1984 | Smit et al. ............... | 474/18 |
| 4,551,119 A * | 11/1985 | Sugaya et al. ............. | 474/28 |
| 4,579,021 A | 4/1986 | Yamamuro et al. | |
| 4,944,201 A * | 7/1990 | Iino et al. ............... | 477/68 |
| 5,113,718 A * | 5/1992 | Sato ..................... | 477/40 |
| 5,961,418 A * | 10/1999 | Taniguchi et al. .......... | 477/47 |
| 6,461,261 B1 * | 10/2002 | Yamamoto et al. ......... | 474/8 |
| 6,508,741 B1 * | 1/2003 | Murakami et al. ......... | 477/149 |
| 6,612,958 B1 * | 9/2003 | Imai et al. .............. | 475/210 |
| 2004/0157700 A1 | 8/2004 | Katou | |

FOREIGN PATENT DOCUMENTS

| EP | 0 899 482 A2 | 3/1999 |
|---|---|---|
| EP | 0 899 865 A2 | 3/1999 |
| JP | 9-32898 A | 2/1997 |

OTHER PUBLICATIONS

U.S. Appl. No. 10/674,069, filed Sep. 30, 2003, Sawada et al.

(Continued)

*Primary Examiner*—Marcus Charles
(74) *Attorney, Agent, or Firm*—Foley & Lardner LLP (57) ABSTRACT

Hydraulic control apparatus includes a belt-drive CVT, a pressure regulator valve (P.REG.V) regulating the oil pressure produced by an oil pressure source, a controller programmed to develop a transmission control signal, a transmission actuator driven based on the signal, and a transmission control valve actuated by the actuator. There are provided a first oil passage for supplying an oil pressure regulated by the P.REG.V, a second oil passage for supplying the oil pressure regulated to a primary pulley cylinder chamber of the CVT and draining the oil pressure therefrom, a third oil passage for draining the oil pressure within the cylinder chamber, and a fourth oil passage downstream of the P.REG.V. The third and fourth oil passages are connected to supply an oil pressure to the cylinder chamber and establish a minimum oil pressure required for clamping the belt depending on reduction of the oil pressure within the cylinder chamber.

10 Claims, 4 Drawing Sheets

OTHER PUBLICATIONS

U.S. Appl. No. 10/664,031, filed Sep. 17, 2003, Yamamoto et al.
U.S. Appl. No. 10/674,091, filed Sep. 30, 2003, Jozaki et al.
U.S. Appl. No. 10/670,270, filed Sep. 26, 2003, Nobu.
U.S. Appl. No. 10/662,442, filed Sep. 16, 2003, Ochiai et al.
U.S. Appl. No. 10/670,223, filed Sep. 26, 2003, Wakayama.
U.S. Appl. No. 10/673,549, filed Sep. 30, 2003, Sawada et al.
U.S. Appl. No. 10/670,775, filed Sep. 26, 2003, Shimanaka et al.

* cited by examiner

HYDRAULIC CONTROL APPARATUS FOR VEHICLE WITH BELT-DRIVE CONTINUOUSLY VARIABLE TRANSMISSION

BACKGROUND OF THE INVENTION

The present invention relates to a hydraulic control apparatus for a vehicle with a belt-drive continuously variable transmission (CVT).

Figure 4A:
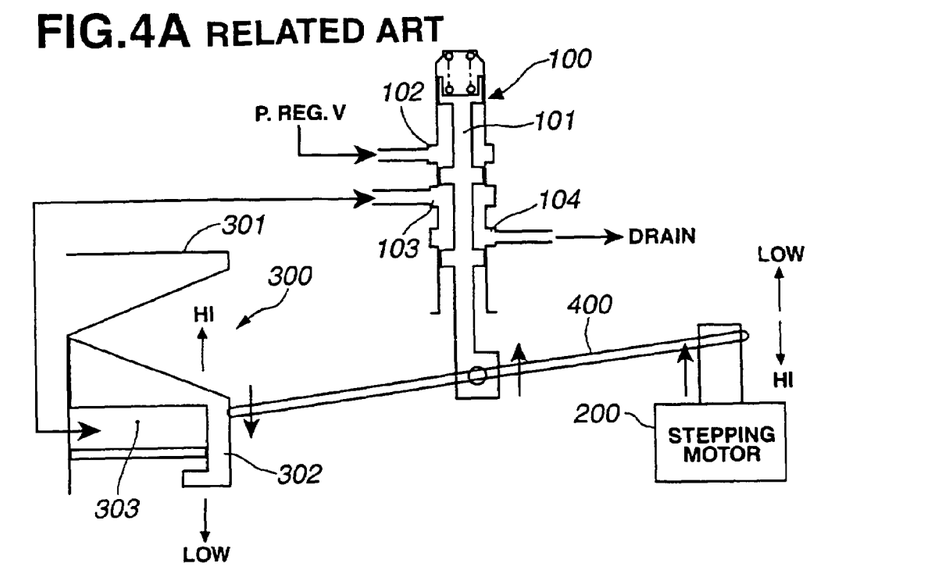
FIGS. 4A and 4B are diagrams showing a relationship between a stepping motor, a transmission control valve and a primary pulley width in the related art.

FIG. 4A illustrates a hydraulic control apparatus of a related art. As illustrated in FIG. 4A, primary pulley 300 of a belt-drive CVT includes fixed disk 301 making a unitary rotation with input rotation transmitted from an engine, and moveable disk 302 axially moveable corresponding to an oil pressure supplied to cylinder chamber 303. Transmission control valve 100 includes spool 101, port 102 communicated with a pressure regulator valve, not shown, port 103 communicated with cylinder chamber 303, and drain port 104 through which an oil pressure in cylinder chamber 303 is drained when communicated with port 103. Spool 101 is connected with stepping motor 200 via link 400. Link 400 is coupled to stepping motor 200 at one end thereof and an outer circumferential periphery of moveable disk 302 at an opposite end thereof. Thus, spool is also connected with moveable disk 302 via link 400. As moveable disk 302 moves, spool 101 is displaced. Stepping motor 200, spool 101 of transmission control valve 100, moveable disk 302 of primary pulley 300 and link 400 constitute a mechanical feedback mechanism for controlling the movement of spool 101.

Figure 4B:
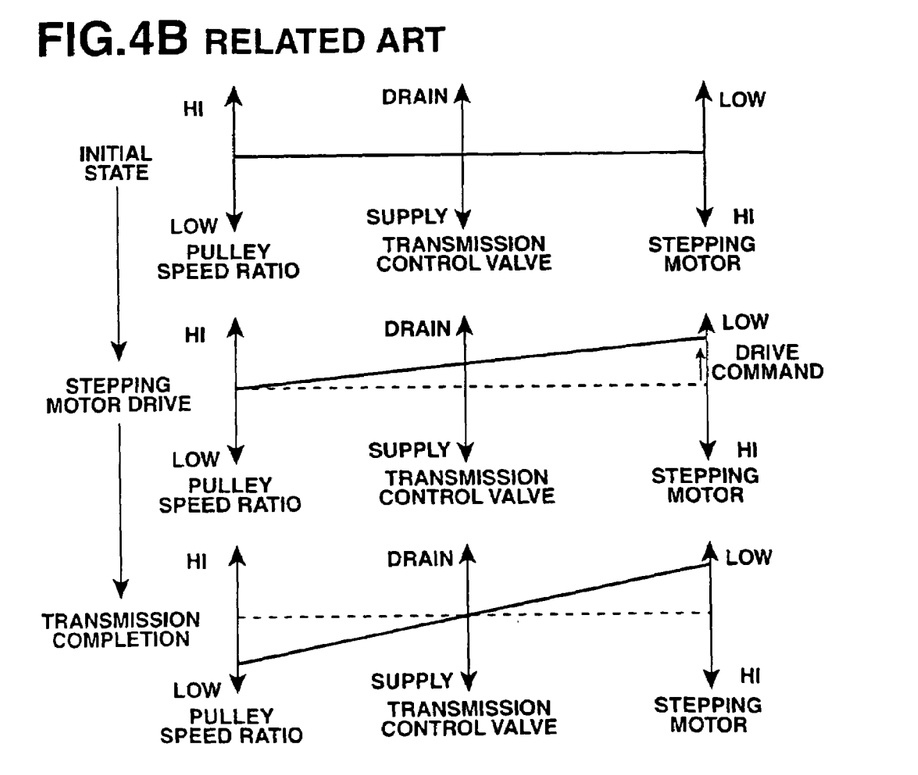

Referring to FIGS. 4A and 4B, an operation of the mechanical feedback mechanism upon changing a transmission ratio of the belt-drive CVT to the Low speed side, namely, upon increasing the transmission ratio, is explained. Here, in other words, the transmission ratio of the belt-drive CVT is a pulley speed ratio between a rotational speed of primary pulley 300 and a rotational speed of a secondary pulley, not shown. FIG. 4B shows, at upper, middle and lower parts thereof, relationships between stepping motor 200, spool 101 of transmission control valve 100 and the pulley speed ratio in an initial state of the mechanical feedback mechanism, in a driven state of stepping motor 200, and in a transmission ratio change completed state, respectively. In the initial state, spool 101 is in a neutral position where the communication between ports 102, 103 and 104 are blocked. When a drive command for controlling the transmission ratio to the Low speed side is outputted to stepping motor 200 as shown in the middle part of FIG. 4B, stepping motor 200 drives spool 101 to upward move from the neutral position shown in the upper part of FIG. 4B to a drain position shown in the middle part of FIG. 4B. In the drain position of spool 101, port 103 is communicated with port 104 to thereby allow drain of the oil within cylinder chamber 303 from port 104. Owing to the drain of the oil within cylinder chamber 303, moveable disk 302 is moved downward as indicated by arrow in FIG. 4A. This causes the opposite end portion of link 400 which is coupled with moveable disk 302 to move downward. As a result, spool 101 is downward moved and return to the neutral position as shown in the lower part of FIG. 4B. In the neutral position, the communication between ports 103 and 104 are prevented so that drain of the oil pressure is stopped. The change of the transmission ratio to the Low speed side is thus completed. Japanese Patent Application First Publication No. 09-032898 discloses a hydraulic control apparatus having such a mechanical feedback mechanism.

SUMMARY OF THE INVENTION

However, in the related art described above, even in a case where the engine is restarted after the vehicle is stopped while the transmission ratio is kept on the High speed side, stepping motor 200 will be controlled so as to change the transmission ratio to the Low speed side in order to ensure a sufficient driving force of the engine. In such a case, ports 303 and 304 are communicated with each other so that the oil within cylinder chamber 303 is drained from port 104 as explained above. The amount of the oil within cylinder chamber 303 becomes insufficient in amount, whereby there will occur slippage of the belt of the CVT.

It is an object of the present invention to eliminate the above-described disadvantage and provide a hydraulic control apparatus for a vehicle with a belt-drive continuously variable transmission (CVT), which is capable of ensuring a transmittable torque capacity of the belt even when the vehicle is stopped while the transmission ratio is kept on the High speed side.

In one aspect of the present invention, there is provided a hydraulic control apparatus for a vehicle having an engine, the hydraulic control apparatus comprising:

a belt-drive continuously variable transmission (CVT) including a primary pulley and a secondary pulley, each of the primary and secondary pulleys having a cylinder chamber to which an oil pressure is supplied and defining a groove variable in width corresponding to the oil pressure, and a belt engaged with the groove to transmit rotation of the primary pulley to the secondary pulley, the belt-drive CVT being operative to continuously vary a transmission ratio by changing the width of the groove;

an oil pressure source operative to produce an oil pressure supplied to the belt-drive CVT, the oil pressure source being adapted to be driven by the engine;

a pressure regulator valve operative to regulate the oil pressure produced by the oil pressure source;

a controller programmed to develop a transmission control signal, the transmission control signal including a high speed transmission control signal for changing the transmission ratio to a high speed side and a low speed transmission control signal for changing the transmission ratio to a low speed side;

a transmission actuator operative to be driven based on the transmission control signal;

a first oil passage for supplying the oil pressure regulated by the pressure regulator valve;

a second oil passage for supplying the oil pressure regulated to the cylinder chamber of the primary pulley and draining the oil pressure from the cylinder chamber of the primary pulley;

a third oil passage for draining the oil pressure within the cylinder chamber of the primary pulley;

a fourth oil passage downstream of the pressure regulator valve; and a transmission control valve operative to be actuated by the transmission actuator for controlling the oil pressure within the cylinder chamber of the primary pulley, the transmission control valve including a first port communicated with the first oil passage, a second port communicated with the second oil passage, a third port communicated with the third oil passage, and a spool having a block position where fluid communication between the first, second and third ports is prevented, a high speed side transmission position where the first port is fluidly communicated with the second port when the transmission actuator is driven in response to the high speed transmission control signal, and a low speed side transmission position where the second port is fluidly communicated with the third port when the transmission actuator is driven in response to the low speed transmission control signal, the spool cooperating with the transmission actuator and the primary pulley to form a mechanical feedback mechanism for returning the spool to the block position in response to change in the width of the groove of the primary pulley, wherein the third oil passage is connected with the fourth oil passage to supply an oil pressure to the cylinder chamber of the primary pulley and establish a minimum oil pressure required for clamping the belt depending on reduction of the oil pressure within the cylinder chamber of the primary pulley.

DETAILED DESCRIPTION OF THE INVENTION

Figure 1:
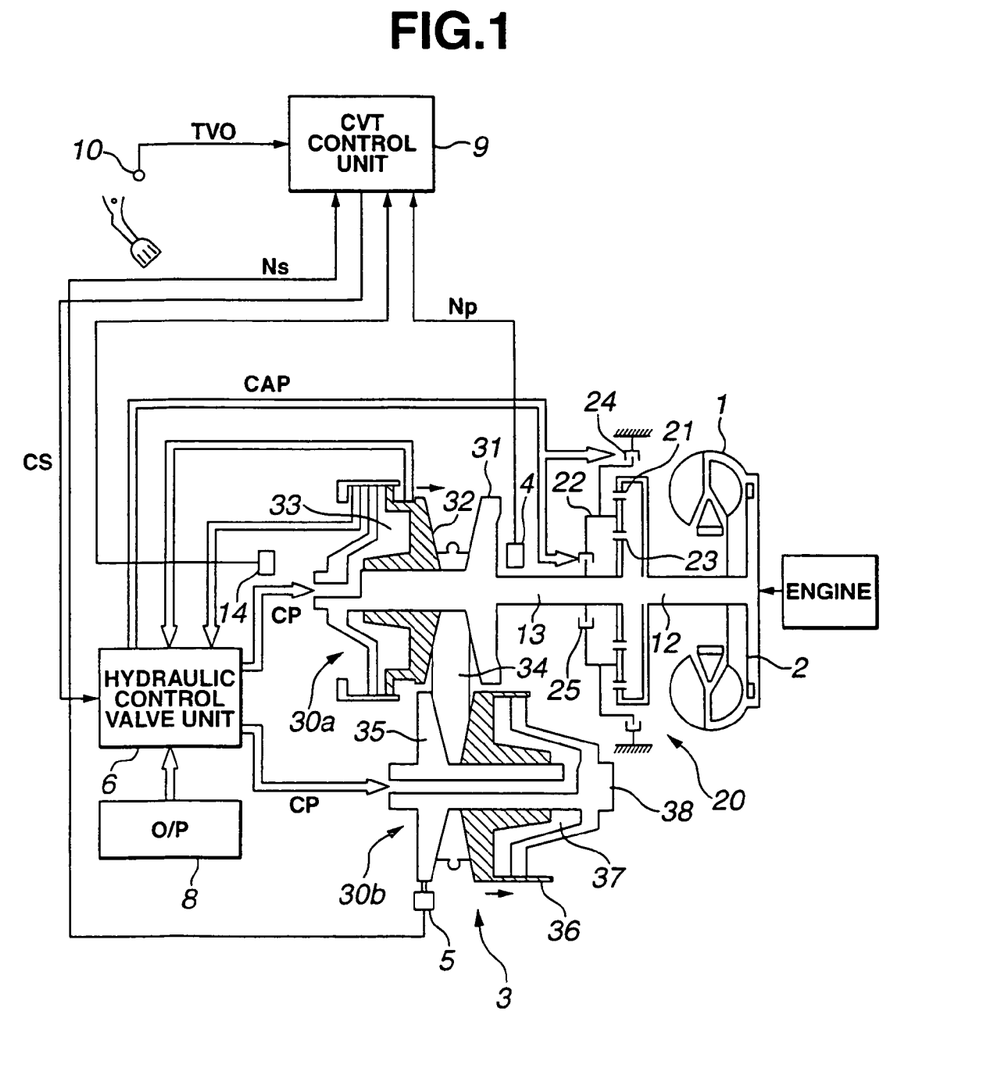
FIG. 1 is a schematic diagram illustrating a control apparatus of a vehicle having a belt-drive continuously variable transmission (CVT), according to an embodiment of the present invention.

Referring to FIG. 1, there is shown a hydraulic control apparatus for a vehicle having an engine and an automatic transmission coupled to the engine, according to an embodiment of the present invention. The automatic transmission is equipped with belt-drive continuously variable transmission (hereinafter referred to as CVT) 3. As illustrated in FIG. 1, CVT 3 is coupled to the engine via lockup clutch 2 for direct connection between CVT 3 and the engine. Torque converter 1 is connected to output shaft 12 of the engine. Forward-reverse switching mechanism 20 is disposed on an output side of torque converter 1. Forward-reverse switching mechanism 20 includes a planetary gear train, reverse brake 24 and forward clutch 25. The planetary gear train includes ring gear 21 coupled to output shaft 12 of the engine, pinion carrier 22, and sun gear 23 coupled to input shaft 13 of CVT 3. Reverse brake 24 is operative to fix pinion carrier 22 to a transmission case. Forward clutch 25 is operative to couple input shaft 13 of CVT 3 and pinion carrier 22 with each other and acts as a start clutch. Oil pump 8 acting as an oil pressure source is mechanically coupled to the engine and directly driven by the engine.

CVT 3 includes primary pulley 30a, secondary pulley 30b and belt 34 connecting primary and secondary pulleys 30a and 30b to thereby transmit the rotation force of primary pulley 30a to secondary pulley 30b. Primary pulley 30a is disposed on a rear side portion of input shaft 13. Primary pulley 30a includes fixed disk 31 rotatable together with input shaft 13, and moveable disk 32 opposed to fixed disk 31 in an axial direction of input shaft 13. Fixed and moveable disks 31 and 32 have generally conical shapes and cooperate with each other to form a V-groove in which belt 34 is engaged. Moveable disk 32 is axially moved on input shaft 13 by an oil pressure supplied to primary pulley cylinder chamber 33. Secondary pulley 30b is disposed on driven shaft 38. Secondary pulley 30b includes fixed conical disk 35 rotatable together with driven shaft 38, and moveable disk 36 opposed to fixed disk 35 in an axial direction of driven shaft 38. Fixed and moveable disks 35 and 36 have generally conical shapes and cooperate with each other to form a V-groove in which belt 34 is engaged. Moveable disk 36 is axially moved on driven shaft 38 by an oil pressure supplied to secondary pulley cylinder chamber 37. A driving gear, not shown, is fixed onto driven shaft 38. The driving gear is operative to drive a driving shaft connected to a wheel via a pinion on an idler shaft, a final gear and a differential gear.

The rotation force outputted from output shaft 12 of the engine is transmitted to input shaft 13 of CVT 3 via torque converter 1 and forward-reverse switching mechanism 20. The rotation force of input shaft 13 is successively transmitted to primary pulley 30a, belt 34, secondary pulley 30b, driven shaft 38, the driving gear, an idler gear, the idler shaft, the pinion, the final gear and the differential gear. Upon thus transmitting the rotation force, moveable disk 32 of primary pulley 30a and moveable disk 36 of secondary pulley 30b are axially moved on input and driven shafts 13 and 38, respectively, to change a width of the V-groove which extends in the axial direction of input and driven shafts 13 and 38. A radius of curvature of a circular arc formed by V-belt 34 contacted with pulleys 30a and 30b is continuously varied by changing the V-groove width. A pulley speed ratio between the rotational speed of primary pulley 30a and the rotational speed of secondary pulley 30b, namely, a transmission ratio of CVT 3, can be thus changed. The change of the V-groove width is conducted by controlling the oil pressure supplied to primary pulley cylinder chamber 33 or secondary pulley cylinder chamber 37. The hydraulic control is performed by CVT controller or control unit 9.

A plurality of sensors are electronically connected to CVT controller 9 to detect engine operating conditions. The sensors includes primary pulley speed sensor 4, secondary pulley speed sensor 5, throttle position sensor 10 and pulley clamping pressure sensor 14. Primary pulley speed sensor 4 detects the rotational speed of primary pulley 30a and generates signal Np indicative of the detected primary pulley speed. Secondary pulley speed sensor 5 detects the rotational speed of secondary pulley 30b and generates signal Ns indicative of the detected secondary pulley speed. Throttle position sensor 10 detects an opening degree of a throttle valve and generates signal TVO indicative of the detected throttle opening degree. Pulley clamping pressure sensor 14 detects a pulley clamping pressure supplied to each of primary and secondary pulley cylinder chambers 33 and 37 for clamping belt 34, and generates signal CP indicative of the detected pulley clamping pressure.

CVT controller 9 receives the signals generated from these sensors, processes the signals, and develops and transmits control signal CS to hydraulic control valve unit 6. CVT controller 9 may be a microcomputer including central processing unit (CPU), input and output ports (I/O), read-only memory (ROM), random access memory (RAM) and a common data bus.

Hydraulic control valve unit 6 receives a plurality of signals indicative of an accelerator opening degree, the transmission ratio of CVT 3, the rotational number of input shaft 13, a primary pulley pressure, and the like. Hydraulic control valve unit 6 controls the transmission ratio of CVT 3 by supplying pulley clamping pressure CP to primary and secondary pulley cylinder chambers 33 and 37 based on the input signals.

Figure 2:
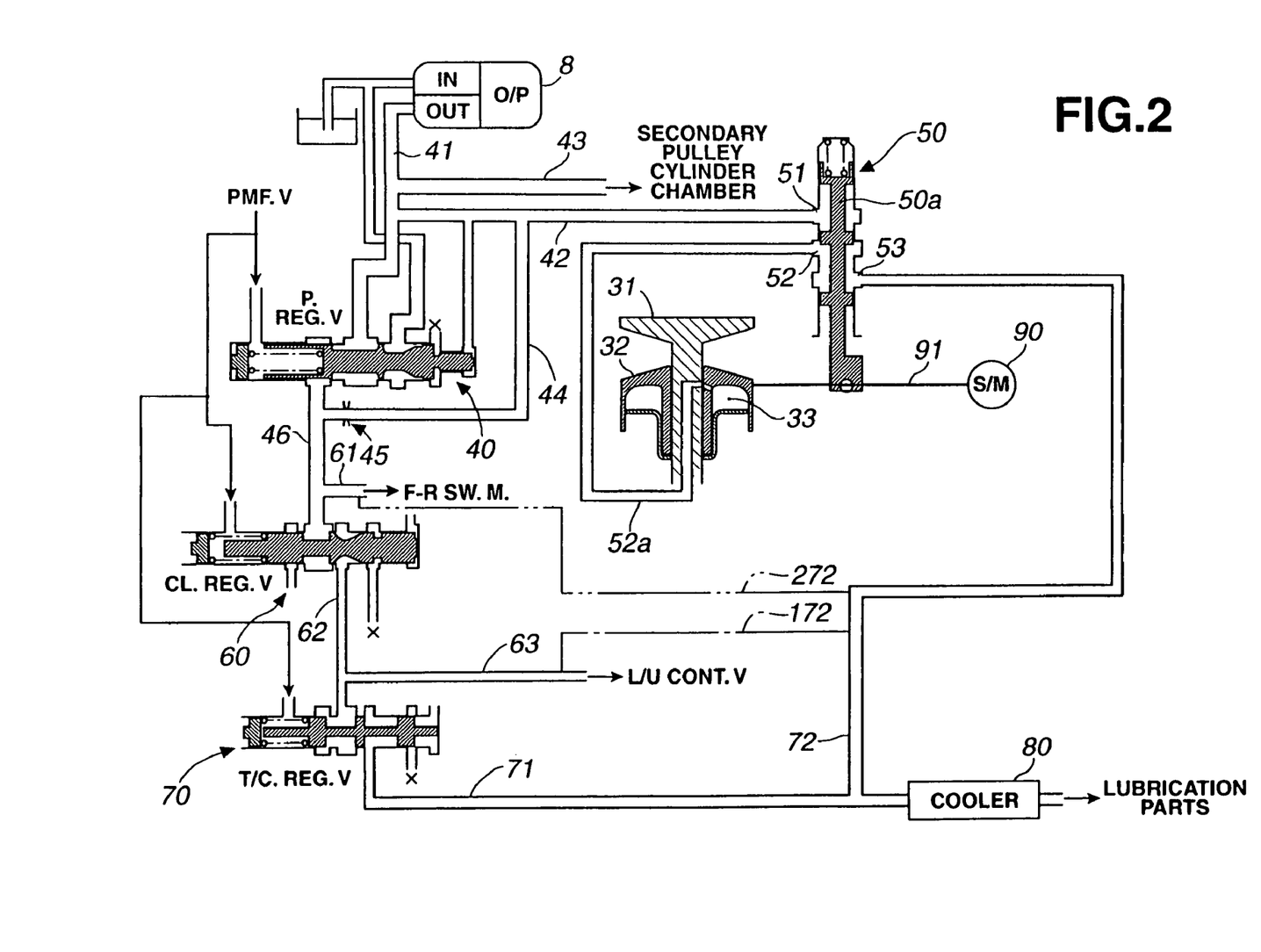
FIG. 2 is a hydraulic circuit diagram of the embodiment shown in FIG. 1, with modifications of the embodiment.

FIG. 2 shows a hydraulic circuit used in the embodiment of the hydraulic control apparatus. As illustrated in FIG. 2, pressure regulator valve 40 is connected to oil pump 8 via oil passage 41. Pressure regulator valve 40 regulates a discharge pressure produced from oil pump 8 and outputs the regulated pressure as line pressure (pulley clamping pressure). Oil passage 43 is communicated with oil passage 41 and supplies pulley clamping pressure CP to secondary pulley cylinder chamber 37. Oil passage 42 as a line pressure supply passage is communicated with oil passage 41 and supplies primary pulley cylinder chamber 33 with pulley clamping pressure CP for clamping belt 34 and a transmission control pressure for controlling the transmission ratio of CVT 3.

Transmission control valve 50 is disposed on oil passage 42 and controls an oil pressure within primary pulley cylinder chamber 33. Namely, transmission control valve 50 controls supply and drain of an oil pressure relative to primary pulley cylinder chamber 33. Specifically, transmission control valve 50 has port 51 connected to oil passage 42, port 52 connected to oil passage 52a which is communicated with primary pulley cylinder chamber 33, and port 53 connected to oil passage 72 which is communicated with oil cooler 80. Transmission control valve 50 also has spool 50a moveable to switch fluid communication between ports 51, 52 and 53. Spool 50a has a block position where the fluid communication between ports 51, 52 and 53 is prevented, a high speed side transmission position where ports 51 and 52 are fluidly communicated with each other to change the transmission ratio to a smaller value, namely, to the High speed side, and a low speed side transmission position where ports 52 and 53 are fluidly communicated with each other to change the transmission ratio to a larger value, namely, to the Low speed side.

Spool 50a is connected with stepping motor 90 and moveable disk 32 of primary pulley 30a via link 91. Spool 50a, stepping motor 90 and moveable disk 32 form a mechanical feedback mechanism for controlling the movement of spool 50a. Stepping motor 90 which acts as a transmission actuator for actuating spool 50a, is driven based on a transmission control signal transmitted from CVT controller 9. The transmission control signal includes a high speed transmission control signal for changing the transmission ratio to the High speed side and a low speed transmission control signal for changing the transmission ratio to the Low speed side. Stepping motor 90 actuates spool 50a to shift between the high speed side transmission position and the low speed side transmission position in response to the high speed transmission control signal and the low speed transmission control signal. Depending on these positions of spool 50a, the oil pressure is supplied to primary pulley cylinder chamber 33 and discharged therefrom. This causes moveable disk 32 to axially move to change the width of the V-groove of primary pulley 30a. In response to the change in the V-groove width, spool 50a connected with moveable disk 32 via link 91 is returned to the block position. In the block position, the supply of the oil pressure and the discharge thereof are stopped and thus the transmission operation is completed. The operation of the mechanical feedback mechanism will be in detail explained later.

An oil pressure drained from pressure regulator valve 40 is supplied to clutch regulator valve 60 downstream of pressure regulator valve 40 via oil passage 46. Oil passage 46 is communicated with oil passage 44 which is communicated with oil passage 42 and has orifice 45. Clutch regulator valve 60 regulates the oil pressure in oil passage 46 and the oil pressure in oil passage 61 to produce forward clutch applying pressure CAP. Forward clutch applying pressure CAP is supplied to forward clutch 25 of forward-reverse switching mechanism 20 via oil passage 61, a select switching valve, not shown, and a select control valve, not shown. With this arrangement, forward clutch applying pressure CAP is regulated smaller than pulley clamping pressure CP.

An oil pressure drained from clutch regulator valve 60 is supplied to torque converter regulator valve 70 downstream of clutch regulator valve 60 via oil passage 62. Torque converter regulator valve 70 regulates the oil pressure in oil passage 62 to produce a torque converter pressure and a lockup clutch applying pressure and a lockup clutch releasing pressure. The lockup clutch applying pressure and the lockup clutch releasing pressure are supplied to a lockup control valve via oil passage 63 communicated with oil passage 62. An oil drained from torque converter regulator valve 70 is supplied to oil cooler 80 via oil passage 71. The oil passing through oil cooler 80 is cooled and supplied to lubrication parts of CVT 3 to be lubricated. Oil passage 71 is connected with oil passage 72 communicated with port 53 of transmission control valve 50.

Figure 3:
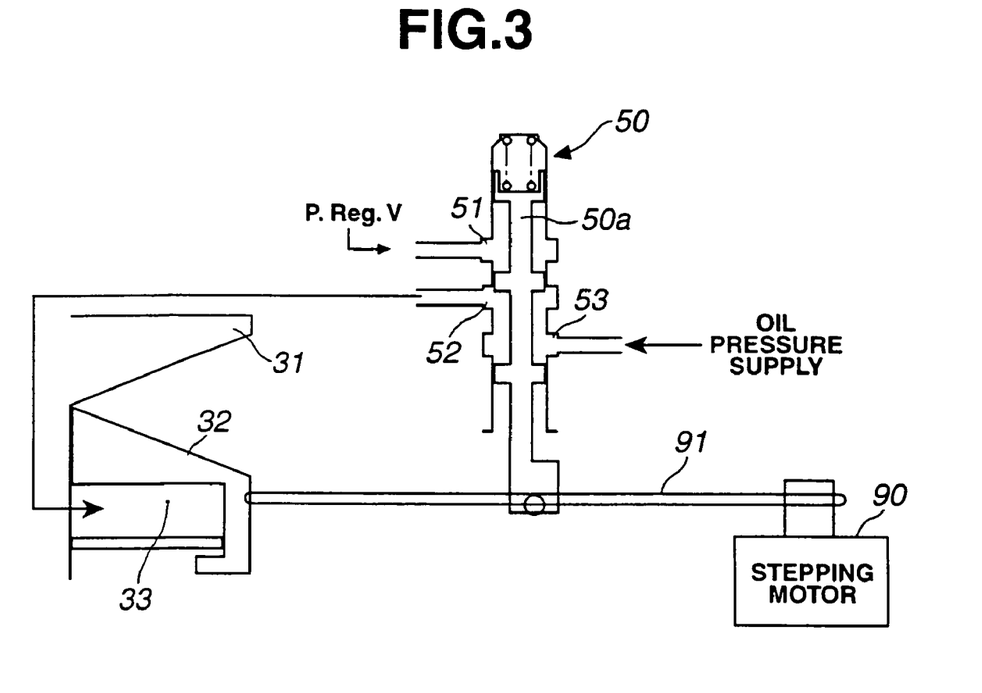
FIG. 3 is a diagram showing a relationship between a stepping motor, a transmission control valve and a primary pulley width.

FIG. 3 illustrates the mechanical feedback mechanism for controlling spool 50a of transmission control valve 50. Referring to FIG. 3, the operation of the feedback mechanism is explained. First, an operation of changing the transmission ratio to the Low speed side, namely, an operation of increasing the transmission ratio, is described. In this case, the width of the V-groove of primary pulley 30a must be increased by draining the oil pressure within primary pulley cylinder chamber 33. First, stepping motor 90 is moved upward as viewed in FIG. 3. Following the movement of stepping motor 90, spool 50a is also upward moved to the low speed side transmission position where port 52 is fluidly communicated with port 53 to thereby allow drain of the oil pressure within primary pulley cylinder chamber 33 from port 53. The oil pressure drained is then supplied to oil cooler 80 via oil passage 72 as shown in FIG. 2. Owing to the drain of the oil pressure within primary pulley cylinder chamber 33, moveable disk 32 is moved downward as viewed in FIG. 3, to thereby increase the width of the V-groove. The transmission ratio is shifted to the Low speed side. The downward movement of moveable disk 32 causes spool 50a to move downward to the block position where the fluid communication between port 52 and port 53 is prevented. As a result, the drain of the oil pressure within primary pulley cylinder chamber 33 is stopped and the change of the transmission ratio to the Low speed side is completed.

Next, an operation of changing the transmission ratio to the High speed side, namely, an operation of decreasing the transmission ratio, is explained. In this case, the width of the V-groove of primary pulley 30a must be decreased by supplying an oil pressure to primary pulley cylinder chamber 33. When stepping motor 90 is moved downward as viewed in FIG. 3, spool 50a is also moved downward to the high speed side transmission position where port 51 is fluidly communicated with port 52 to thereby allow supply of the oil pressure from pressure regulator valve 40 to primary pulley cylinder chamber 33. This causes moveable disk 32 to move upward as viewed in FIG. 3, to thereby decrease the width of the V-groove. Thus, the transmission ratio is shifted to the High speed side. The upward movement of moveable disk 32 causes spool 50a to move upward to the block position where the fluid communication between port 51 and port 52 is prevented. As a result, the supply of the oil pressure to primary pulley cylinder chamber 33 is stopped and the change of the transmission ratio to the High speed side is completed.

When the vehicle is stopped while the transmission ratio is kept on the High speed side, spool 50a is placed in the block position where port 52 is prevented from fluid communication with port 51 and port 53. In this condition, when the engine is restarted and stepping motor 90 is actuated to drive spool 50a for changing the transmission ratio to the Low speed side, port 52 and port 53 are communicated with each other. Therefore, the oil pressure to be supplied from torque converter regulator valve 70 toward oil cooler 80 via oil passage 71 is supplied to primary pulley cylinder chamber 33 via oil passages 71 and 72, ports 53 and 52, and oil passage 52a. This can establish the oil pressure, namely, pulley clamping pressure CP, within primary pulley cylinder chamber 33, which is required to clamp belt 34, to thereby prevent occurrence of slippage of belt 34. This serves for improving durability of belt 34.

Further, the oil pressure regulated by clutch regulator valve 60 is smaller than the oil pressure regulated by pressure regulator valve 40. The oil pressure regulated by torque converter regulator valve 70 is smaller than the oil pressure regulated by clutch regulator valve 60. Port 53 is connected with oil passage 72 connected with the downstream side of pressure regulator valve 40. Specifically, oil passage 72 is connected with oil passage 71 for supplying the oil pressure from torque converter regulator valve 70 to oil cooler 80. With the arrangement, in an ordinary case where the transmission ratio is on the Low speed side, the oil can be discharged from port 53 without adversely influencing other hydraulic control circuits. On the other hand, in a case where the oil pressure within primary cylinder chamber 33 becomes lower than a minimum oil pressure required for clamping belt 34, for instance, upon the vehicle stopping while the transmission ratio being kept on the High speed side, upon the occurrence of failure of transmission actuator 90, and the like, the oil discharged from torque converter regulator valve 70 toward oil cooler 80 and the lubrication parts can be bypassed and supplied to primary cylinder chamber 33 via oil passages 71 and 72 and ports 53 and 52. This can establish the oil pressure within primary cylinder chamber 33 which is sufficient to clamp belt 34 and prevent slippage of belt 34.

Further, the connection between port 53 and the oil passage downstream of pressure regulator valve 40 is not limited to the above embodiment. Port 53 may be connected with other oil passages downstream of pressure regulator valve 40 in which the oil pressure smaller than the line pressure produced by pressure regulator valve 40 but larger than the minimum oil pressure required for clamping belt 34 is established. For example, as illustrated by broken lines in FIG. 2, port 53 may be connected with oil passage 63 via oil passage 172 or may be connected with oil passage 61 via oil passage 272. In such a case, the same effect as described above can be performed.

This application is based on a prior Japanese Patent Application No. 2002-285499 filed on Sep. 30, 2002. The entire contents of the Japanese Patent Application No. 2002-285499 is hereby incorporated by reference.

Although the invention has been described above by reference to a certain embodiment of the invention and the modifications, the invention is not limited to the embodiment and modifications described above. Modifications and variations of the embodiment and modifications described above will occur to those skilled in the art in light of the above teachings. The scope of the invention is defined with reference to the following claims.

What is claimed is:

1. A hydraulic control apparatus for a vehicle having an engine, the hydraulic control apparatus comprising:

a belt-drive continuously variable transmission (CVT) including a primary pulley and a secondary pulley, each of the primary and secondary pulleys having a cylinder chamber to which an oil pressure is supplied and defining a groove variable in width corresponding to the oil pressure, and a belt engaged with the groove to transmit rotation of the primary pulley to the secondary pulley, the belt-drive CVT being operative to continuously vary a transmission ratio by changing the width of the groove;

an oil pressure source operative to produce an oil pressure supplied to the belt-drive CVT, the oil pressure source being adapted to be driven by the engine;

a pressure regulator valve operative to regulate the oil pressure produced by the oil pressure source;

a controller programmed to develop a transmission control signal, the transmission control signal including a high speed transmission control signal for changing the transmission ratio to a high speed side and a low speed transmission control signal for changing the transmission ratio to a low speed side;

a transmission actuator operative to be driven based on the transmission control signal;

a first oil passage for supplying the oil pressure regulated by the pressure regulator valve;

a second oil passage for supplying the oil pressure regulated to the cylinder chamber of the primary pulley and draining the oil pressure from the cylinder chamber of the primary pulley;

a third oil passage for draining the oil pressure within the cylinder chamber of the primary pulley;

a fourth oil passage downstream of the pressure regulator valve; and a transmission control valve operative to be actuated by the transmission actuator for controlling the oil pressure within the cylinder chamber of the primary pulley, the transmission control valve including a first port communicated with the first oil passage, a second port communicated with the second oil passage, a third port communicated with the third oil passage, and a spool having a block position where fluid communication between the first, second and third ports is prevented, a high speed side transmission position where the first port is fluidly communicated with the second port when the transmission actuator is driven in response to the high speed transmission control signal, and a low speed side transmission position where the second port is fluidly communicated with the third port when the transmission actuator is driven in response to the low speed transmission control signal, the spool cooperating with the transmission actuator and the primary pulley to form a mechanical feedback mechanism for returning the spool to the block position in response to change in the width of the groove of the primary pulley, wherein the third oil passage is connected with the fourth oil passage to supply an oil pressure to the cylinder chamber of the primary pulley and establish a minimum oil pressure required for clamping the belt depending on reduction of the oil pressure within the cylinder chamber of the primary pulley.

2. The hydraulic control apparatus as claimed in claim 1, wherein the vehicle includes a torque converter disposed between the engine and the belt-drive CVT so as to increase torque of the engine, a lockup clutch allowing direct coupling of the engine and the belt-drive CVT, an oil cooler, and lubrication parts, the hydraulic control apparatus further comprising:
   a torque converter regulator valve disposed downstream of the pressure regulator valve, the torque converter regulator valve being operative to produce a torque converter pressure and a lockup clutch applying pressure and a lockup clutch releasing pressure to be supplied to the lockup clutch;
   wherein the fourth oil passage is a cooler-lubrication oil supply passage for supplying an oil pressure drained from the torque converter regulator valve to the oil cooler and the lubrication parts.

3. The hydraulic control apparatus as claimed in claim 1, wherein the vehicle includes a start clutch operative to be applied when the vehicle is started, a torque converter disposed between the engine and the belt-drive CVT so as to increase torque of the engine, and a lockup clutch allowing direct coupling of the engine and the belt-drive CVT, the hydraulic control apparatus further comprising:
   a clutch regulator valve operative to regulate an oil pressure drained from the pressure regulator valve and produce a start clutch applying pressure to be supplied to the start clutch; and
   a torque converter regulator valve operative to regulate an oil pressure drained from the clutch regulator valve and produce a torque converter pressure and a lockup clutch applying pressure and a lockup clutch releasing pressure to be supplied to the lockup clutch;
   wherein the fourth oil passage is a lockup clutch oil supply passage for supplying the lockup clutch applying pressure and the lockup clutch releasing pressure to the lockup clutch.

4. The hydraulic control apparatus as claimed in claim 3, wherein the lockup clutch oil supply passage is communicated with an oil passage connecting the clutch regulator valve and the torque converter regulator valve.

5. The hydraulic control apparatus as claimed in claim 1, wherein the vehicle includes a start clutch operative to be applied when the vehicle is started, and a lockup clutch allowing direct coupling of the engine and the belt-drive CVT, the hydraulic control apparatus further comprising:
   a clutch regulator valve operative to regulate an oil pressure drained from the pressure regulator valve and produce a start clutch applying pressure to be supplied to the start clutch;
   wherein the fourth oil passage is a start clutch oil supply passage for supplying the start clutch applying pressure to the start clutch.

6. The hydraulic control apparatus as claimed in claim 5, wherein the start clutch oil supply passage is communicated with an oil passage connecting the pressure regulator valve and the clutch regulator valve.

7. The hydraulic control apparatus as claimed in claim 6, wherein the oil passage connecting the pressure regulator valve and the clutch regulator valve is communicated with the first oil passage.

8. The hydraulic control apparatus as claimed in claim 1, wherein the first oil passage is communicated with an oil passage connecting the oil pressure source and the pressure regulator valve to supply the oil pressure produced by the oil pressure source to the pressure regulator valve.

9. The hydraulic control apparatus as claimed in claim 1, further comprising a link connecting the transmission actuator, the spool and the primary pulley, the link forming the mechanical feedback mechanism together with the transmission actuator, the spool and the primary pulley.

10. The hydraulic control apparatus as claimed in claim 1, wherein the transmission actuator is a stepping motor.

* * * * *